April 11, 1933. C. H. FOSTER 1,903,423
SHOCK ABSORBER
Filed June 16, 1928 3 Sheets-Sheet 1
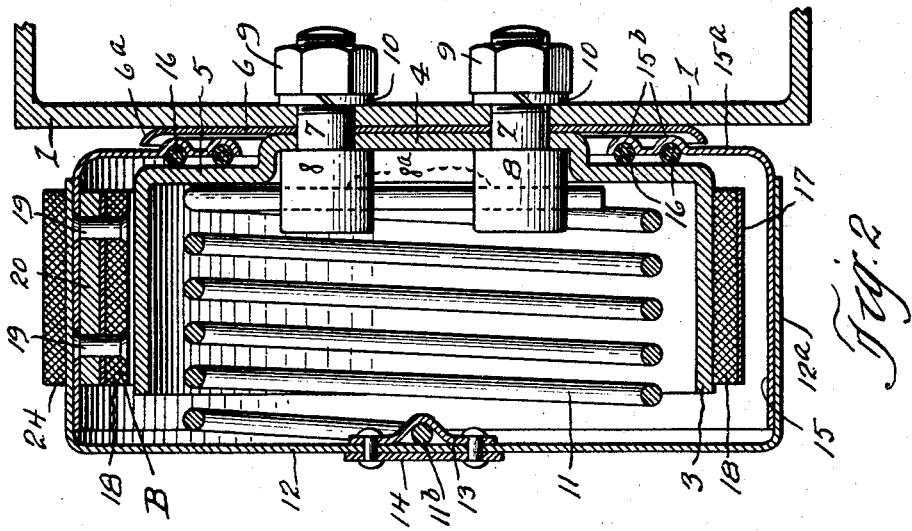
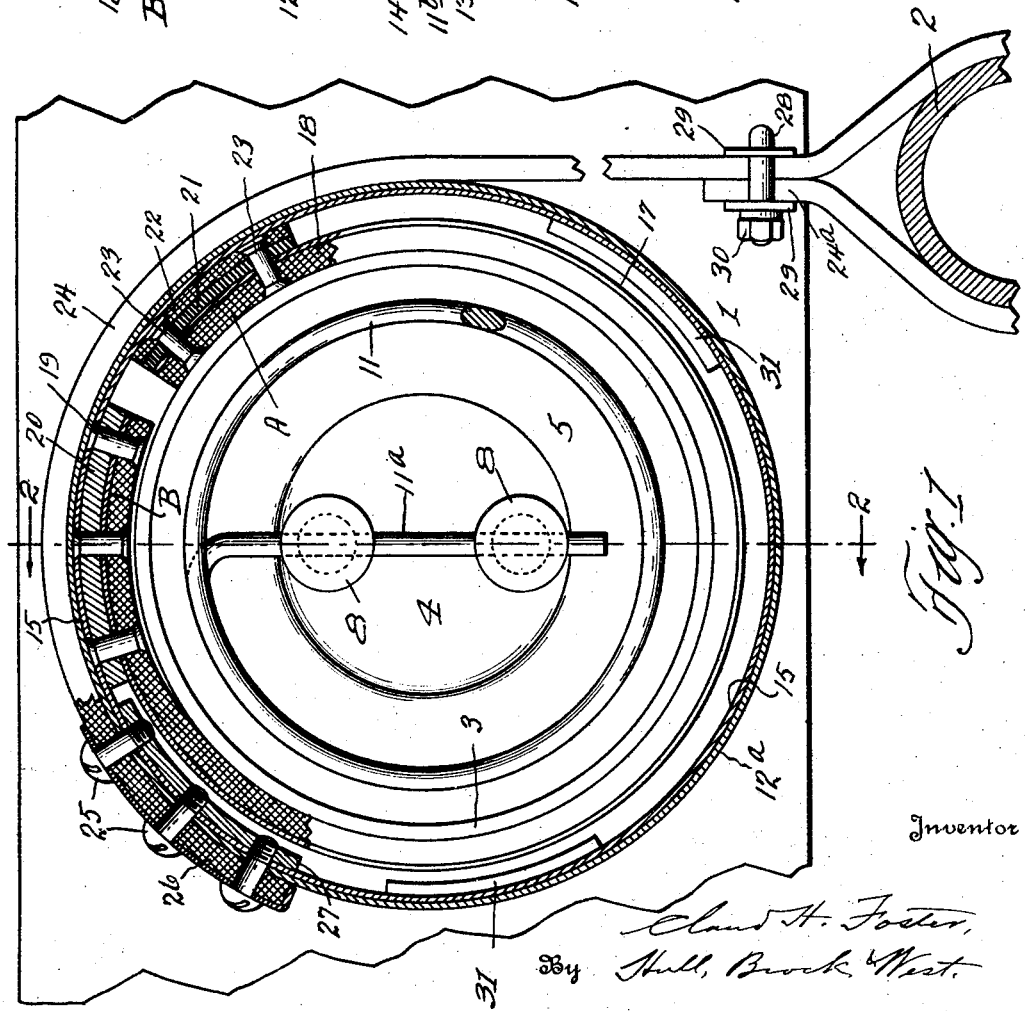

April 11, 1933. C. H. FOSTER 1,903,423
SHOCK ABSORBER
Filed June 16, 1928 3 Sheets-Sheet 2
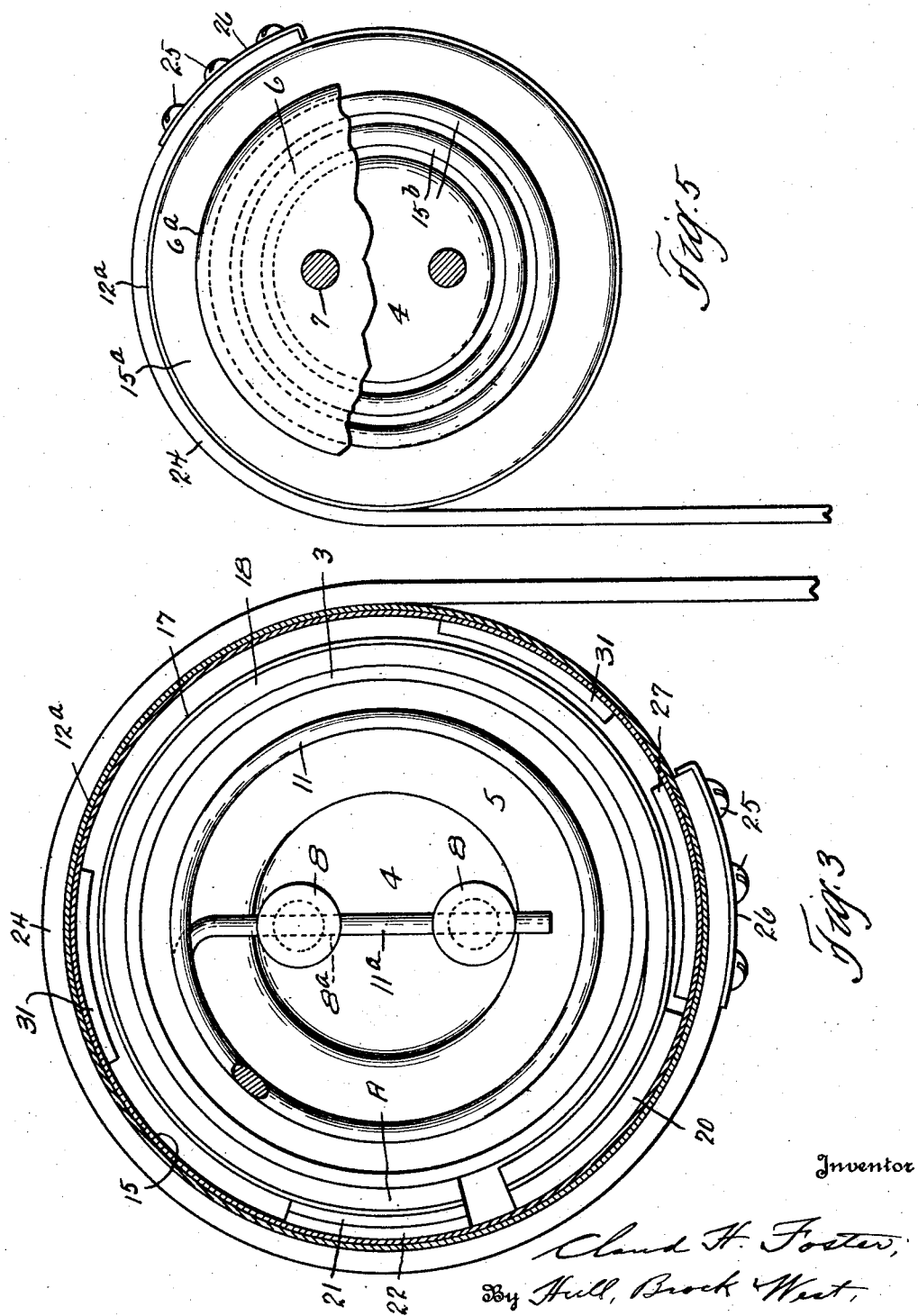

April 11, 1933.  C. H. FOSTER  1,903,423
SHOCK ABSORBER
Filed June 16, 1928   3 Sheets-Sheet 3
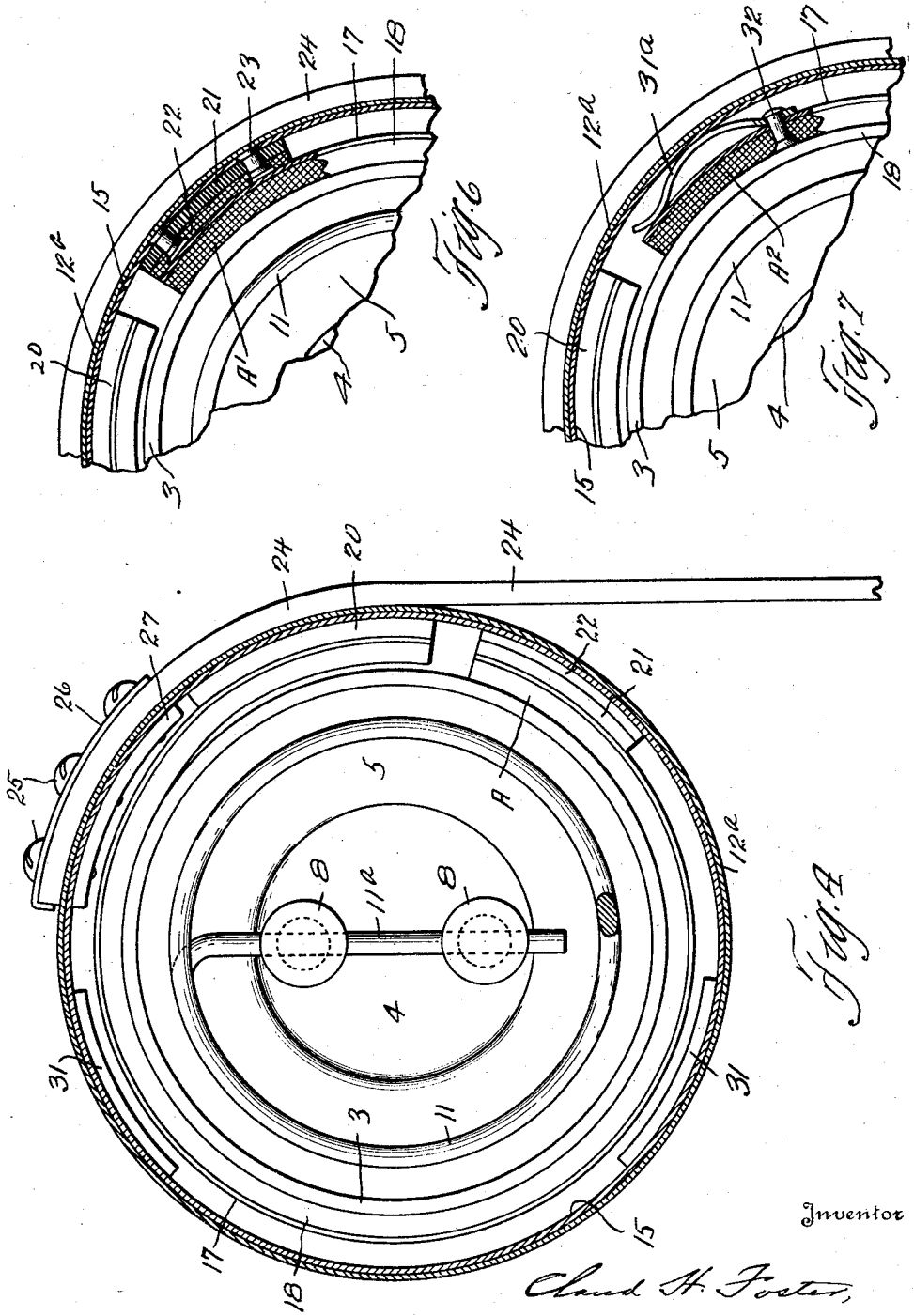

Patented Apr. 11, 1933

1,903,423

UNITED STATES PATENT OFFICE

CLAUD H. FOSTER, OF WICKLIFFE, OHIO

SHOCK ABSORBER

Application filed June 16, 1928. Serial No. 285,910.

This invention relates to shock absorbers such as are interposed between the axles and bodies of automobiles for the purpose of checking relative movements therebetween due to the encountering of obstacles or depressions by the wheels.

The shock absorber herein shown consists generally of a brake drum with a composite brake band arranged externally of the drum, and a strap operatively connected to the said band for operating the same, there being a helical spring connected with the band for taking in the slack of the strap and for moving the brake band therewith, as the vehicle members approach each other.

It is the general purpose and object of the invention to provide a shock absorber which is not only simple of construction and economical of production, but which will automatically effect the gripping or braking action of the brake band upon the drum by the separation of the body and axle and which also will automatically effect the release of such gripping or braking action under conditions to be pointed out hereinafter.

A further object of the invention is to provide a shock absorber of this type which is capable of withstanding and accommodating all ordinary incidents of use. Further and more limited objects of the invention will appear hereinafter and will be realized in and through the construction and arrangement of parts shown in the drawings hereof, wherein Fig. 1 represents a sectional elevation of a shock absorber constructed in accordance with my invention, showing the parts in the positions which they occupy when the vehicle springs are compressed somewhat more than under ordinary or normal riding conditions; Fig. 2, a sectional view corresponding to the line 2—2 of Fig. 1; Fig. 3 a view similar to Fig. 1, showing the parts in the positions which they assume when the axle and vehicle body have approached each other following a more severe compression of the vehicle springs; Fig. 4, a view similar to Figs. 1 and 3, showing the positions of the parts when the body and axle shall have separated a sufficient distance to release the braking action; Fig. 5 a rear elevation of the shock absorber shown in the preceding views, with certain parts broken away; and Figs. 6 and 7, details in sectional elevation showing modifications of the brake band construction.

Describing the various parts by reference characters, and first in connection with Figs. 1 to 5, inclusive, 1 denotes one of the side frame members and 2 the axle housing of a vehicle. 3 denotes a cylindrical brake drum having a bottom or back wall, the central portion 4 of which is offset from the peripheral portion 5, such offset portion being seated within a metal disk 6 having a rounded peripheral flange $6^a$. The brake drum is secured to the side frame member 1 by means of bolts, the shanks of which are indicated at 7 and which shanks project through openings in the parts 1, 4 and 6. Each bolt is provided with an enlarged cylindrical head 8 within the body of the brake drum, the opposite ends of the bolts being threaded and provided with nuts 9 and lock washers 10.

The bolt heads 8 are provided each with a transverse bore $8^a$ adapted to receive the inner end $11^a$ of a helical spring 11, thereby to anchor the spring within the drum. The outer end $11^b$ of the said spring is secured to the inner or rear face of the flat front or outer plate 12 of the outer cover member of a housing, which cover member comprises the said plate and a cylindrical wall $12^a$. The end $11^b$ may be secured to the plate 12 in any convenient manner, as by means of one or more inner clamping members 13 having each a V-shaped groove at its center adapted to engage the said end of the spring, the clamping members being riveted through the plate 12 to a plate 14 on the front of the plate 12, which plate 14 may be a name plate.

The wall $12^a$ telescopes over a cylindrical wall 15 of the rear or inner housing member, and the latter wall merges with a rear annular wall $15^a$ having its inner edge spaced from the central portion 4 of the base of the brake drum. The rear annular wall $15^a$ is provided with a pair of rearwardly or inwardly extending annular grooves 15$^b$ therein, each of which is adapted to receive a packing ring 16, which packing rings engage the portion 5 of the rear or inner wall of the brake drum, thereby to prevent the entrance of dust into the interior of the housing which encloses the brake drum and the brake band. The entrance of dust is further prevented by means of the flanged disk 6, 6$^a$.

The housing constituted by the parts 12, 12$^a$ and 15, 15$^a$ is spaced from the brake drum and is movable with reference thereto, for a purpose to be explained hereinafter.

17 denotes a spring metal band having therewithin and attached thereto a friction band 18, the said band being of any suitable material, such as fabric belting. The spring band 17 is given a curvature such that it tends to hold the band 18 in close engagement with the outer surface of the drum 3. The composite band is of such length that, when applied to the drum, its ends will be spaced apart. It is connected at one end to the housing wall 15 by means of rivets 19, there being a filler strip 20 inserted between the band 17 and the inner face of the housing wall, but the total thickness of the filler strip and of the bands 17 and 18 at this point is considerably less than the normal width of the space between the brake drum and the housing wall 15, so that this end of the brake band is lifted clear of and spaced from the drum, as shown particularly in Figs. 1, 2 and 4. The opposite end of the brake band is built up so as to fill, or substantially fill, the space between the brake drum and the wall 15. This building-up is effected by means of strips 21 and 22 applied to the outer face of the band 18, the parts 17, 18, 21 and 22 being secured together by rivets 23. One of the strips 21, 22 must be yieldable, and for this purpose I prefer to make such strip of soft rubber. The strip 21, in this form of my invention, is made of rubber, while the strip 22 is preferably made of fabric belting. The built-up end of the brake band is designated generally by the letter A and the opposite end is designated generally by the letter B.

For the purpose of causing the brake band to function through the separation of the body and axle, I secure to the housing the upper end portion 24 of a strap C. This strap is conveniently secured to both walls 12$^a$ and 15 of the housing by means of short screw bolts 25 extending through a metal plate 26 on the outer surface of the strap and through openings in the housing walls 12$^a$ and 15, their inner ends being threaded into a curved metal plate 27 engaging the interior of the wall 15$^a$. The lower portion of the strap C is looped around the axle housing 2, and the extreme end 24$^a$ of such portion is fastened to the body of the strap by means of a U-bolt 28, plates 29, and nuts 30 on the ends of the legs of the bolt.

In Figs. 1 and 2, the parts A and B are shown as somewhat above the positions which they occupy during ordinary or normal riding. Owing to the fact that the housing floats with reference to the brake drum, some light pressure will be exerted through the strap C and through the built-up end A of the brake band upon the drum. The opposite end B of the strap will be free from the drum, as explained hereinbefore. It will be noted that, when in the position shown in Figs. 1 and 2, the brake band can travel in a clockwise direction only a short distance before the strap C will be substantially tangent to the surface of the part of the housing immediately over such built-up end. The purpose of this arrangement will be explained hereinafter.

With the parts constructed and arranged as described, when the wheels encounter an obstacle which moves the axle toward the body, the spring 11 will move the brake band freely in a counter-clockwise direction around the brake drum, taking in the slack of the strap C. No matter how rapid may be the movement of the axle toward the body, or vice versa, the spring is under sufficient torsion to enable it immediately to fleet the brake band around the drum and to take in the slack of the strap. At the end of this movement, the parts may be approximately in the positions shown in Fig. 3. On rebound, or separation of the body and axle, the strap C, due to the floating of the housing to which it is connected as well as to the somewhat yielding nature of the housing, will press the built-up end A of the brake band against the drum, while pulling on the opposite end of the strap, against such pressure. The more severe or rapid the rebound, the more quickly and strongly will the built-up end of the brake band be pressed against the drum, with the result that the rebound or separation will be resisted in proportion to such violence of action or rapidity of separation.

However, it is not desirable that the braking action shall continue throughout the entire range of rebound movement, as this would interfere with ease of riding and with the desirable action of the vehicle springs. Therefore, as the built-up end A approaches a position where the strap C becomes tangent to the housing, the pressure of such end A of the band upon the brake drum is relaxed and, when this position of tangency is reached and the built-up end shall have passed beyond the point where it can be pressed against the drum by the strap C, further separation will be resisted only by the vehicle springs and by the comparatively slight resistance afforded by the spring 11.

The purpose of the yieldable cushion constituted by the strips 21 and 22 is to prevent too strong a clamping engagement of the end A of the brake band upon the drum, which would result in breaking the band C or in shearing the bolts 25 or 7.

To prevent undesirable displacement or floating of the housing toward the brake band and brake drum, one or more stop pads 31 of any suitable material (as fabric belting) may be applied to the interior of the housing, being of less thickness than the average width of the space between the housing and the brake band.

A further advantage of the construction and arrangement of parts shown herein is that, when riding under normal conditions, if one or more of the wheels of the vehicle should drop into a hole in the road, there will be practically no braking action, as the built-up end of the brake band is so located that it is not pressed against the brake drum by the brake band and passes below the point where such action can occur. This prevents the body from being pulled down by the axle, to the discomfort of the occupants of the vehicle.

Furthermore, because of the fact that the housing is movable or floats with reference to the brake drum and because of the fact that the metal of which it is composed is resilient, the end A of the brake band will always be in effective engagement with the brake drum and the housing when the body and axle are moving away from each other— up to the time when the end A shall have passed below the place at which it is subjected to the pressure of the strap C.

In Fig. 6, there is shown a modification of the invention, wherein the cushions or pads 21 and 22 of the built-up end A' of the brake band are reversed; in other respects the construction is the same as shown in Figs. 1 to 4, inclusive, and the operation of the device is substantially the same as the operation of the device shown in said Figs. 1 to 4.

In Fig. 7 there is shown a still further modification of the invention, wherein the building up of the end A² of the brake band is accomplished by inserting between the inner wall 15 of the housing and the band 17 a flat spring 31ª having an intermediate arch adapted to bear against the wall 15 and to bear at its opposite ends against the strip 17, one of such ends being secured to said strip and to the strap 18 by means of one or more rivets 32.

In describing the invention, it has been assumed, for convenience of description, that the brake drum and housing will be carried by one of the side frame members and that the strap C will be secured to the upper portion of the housing and extend around such upper portion, with its lower end secured to the axle housing; and the terms "upper" and "lower" have been used in connection with such description, but without any intention of limiting thereby the use of the invention to such specific location and arrangement of parts.

Furthermore, while I have described the flexible member C as a "strap", I do not intend thereby to limit my invention to the use of any particular material or to any particular shape of material which may be employed for such strap or member.

The spring 11 is normally under light compression, as well as under torsion, whereby it presses the packing 16 against the back wall 5 of the brake drum, thereby compensating for wear and preventing entrance of dust, etc. into the housing.

Having thus described my invention, what I claim is:—

1. A shock absorber comprising a brake drum adapted to be secured to one of two relatively movable vehicle members, a housing surrounding the said drum and spaced therefrom, a strap connected at one end to the exterior of said housing and adapted to be connected at its other end to the other vehicle member and arranged to engage the outer surface of the housing, a spring having one end anchored with respect to the housing and its other end connected to said housing, and a brake band on the said drum having one end secured to the housing and having its opposite end in proximity to such first-mentioned end, the second mentioned end of the brake band substantially filling the space between the brake drum and the housing and the first mentioned end of the brake band being spaced from the brake drum, the said housing being mounted so as to be movable toward the brake drum through the pull of said strap upon said housing.

2. A shock absorber comprising a brake drum adapted to be secured to one of two relatively movable vehicle members, a housing surrounding the said drum and spaced therefrom and movable toward and from the drum, a strap connected at one end to the exterior of said housing and adapted to be connected at its other end to the other vehicle member and arranged to engage the outer surface of the housing, a spring having one end anchored with respect to the housing and its other end connected to said housing, a brake band on the said drum having one end secured to the housing and spaced from said drum and having its opposite end adapted to be pressed against the drum by the action of the strap on the housing.

3. A shock absorber comprising a brake drum adapted to be secured to one of two relatively movable vehicle members, a housing surrounding the said drum and spaced therefrom, a strap connected at one end to the exterior of said housing and adapted to be connected at its other end to the vehicle member and arranged to engage the outer surface of the housing, a spring having one end anchored with respect to the housing and its other end connected to said housing, and a brake band on the said drum having one end secured to the housing and spaced from said drum, there being a yieldable pad or cushion interposed between the other end of the brake band and the adjacent portion of the housing whereby such end of the brake band substantially fills the space between the said brake band and housing, the said housing being mounted so as to be movable toward the brake drum through the pull of the strap upon said housing.

4. A shock absorber comprising a brake drum adapted to be secured to one of two relatively movable vehicle members, a housing surrounding the said drum and spaced therefrom, a strap connected at one end to the exterior of said housing and adapted to be connected at its other end to the other vehicle member and arranged to engage the outer surface of the housing, a spring having one end anchored with respect to the housing and its other end connected to said housing, a brake band comprising an inner strip of friction material and an outer strip of spring metal arranged to hold the first mentioned strip in engagement with the outer surface of the brake drum throughout the greater portion of the lengths of said strips, means for securing one end of the brake band to said housing adjacent to the point of attachment of the end of the strap to said housing, such end of the brake band being spaced from the brake drum, and a yieldable cushion carried by the opposite end of the brake band and substantially filling the space between such end portion and the housing.

5. A shock absorber adapted to be interposed between two relatively movable vehicle members, the said shock absorber comprising a brake drum having a base by means of which it may be secured to one of said members, a housing surrounding the brake drum and enclosing the open end thereof and having an annular wall interposed between the outer portion of the base of the said drum and the vehicle member to which said drum is attached, the said annular wall being provided with an annular recess projecting away from the base of said drum, a packing ring in said recess adapted to engage the base of said drum, a spring having one end anchored within the said drum and its opposite end secured to the cover portion of the said housing, a strap secured at one end to the exterior of the housing and bearing on the said housing, and a brake band on the exterior surface of the brake drum and having one end secured to the said housing and spaced from the brake drum and having its opposite end thickened thereby to engage both the brake drum and the interior of the housing.

6. A shock absorber adapted to be interposed between two relatively movable vehicle members, the said shock absorber comprising a brake drum having a base, the base comprising an annular wall projecting inwardly from one end of the brake drum and a central wall projecting outwardly from such annular wall and adapted to be secured to one of the vehicle members, a disk adapted to be interposed between the said central wall and the vehicle member to which said wall is attached, the said disk having a flanged periphery projecting toward such annular wall but spaced therefrom, a housing surrounding and spaced from the brake drum and having a cover for the open end thereof and having an inwardly projecting annular wall adapted to be interposed between the annular wall of the base of the drum and the said disk, the said annular housing wall having one or more annular recesses therein facing the annular wall of the brake drum, a packing ring in each such recess, a helical spring having one end anchored within the brake drum and having its opposite end secured to the housing cover, a strap secured at one end to the housing and engaging the outer surface of said housing, and a brake band interposed between the said housing and the brake drum and adapted to be operatively applied to the said drum by movement of the housing with reference to the drum in a direction opposed by the said spring.

7. The combination, with two relatively movable vehicle members, of a shock absorber comprising a brake drum secured to one of said members, a brake band on said drum, and flexible means connected with the other vehicle member and with one end of the brake band, the said flexible connecting means operating, during movements of the vehicle members away from each other, to press one end of the brake band against the drum with the opposite end of said band free and to release the pressure on the first mentioned end of the brake band when the vehicle members shall have moved apart a predetermined distance, and means for moving the brake band freely during movements of the vehicle members toward each other.

8. The combination, with two relatively movable vehicle members, of a shock absorber comprising a drum secured to one of said members, a brake band on said drum, flexible means connecting the other vehicle member with the brake band, the said flexible coning the brake band freely during movements of the vehicle members away from each other, to press one end of the brake band against the drum while pulling upon the opposite end and to release the pressure on the first-mentioned end of the brake band when the vehicle members shall have been moved apart a predetermined distance.

9. The combination, with two relatively movable vehicle members, of a shock absorber comprising a brake drum secured to one of the said members, a brake band cooperating with said drum, and a flexible connection between the other vehicle member and the said brake band operating to cause the said band to exert a braking pressure against the drum during movements of a predetermined amplitude of the vehicle members away from each other and to release such pressure when such amplitude shall have been exceeded as well as during movements of the said vehicle members toward each other, and a spring connected with said brake band for moving the same and taking in the slack of said flexible connection during the latter movements of the vehicle members.

10. The combination, with two relatively movable vehicle members, of a shock absorber comprising a brake drum secured to one of the said members, a brake band cooperating with said drum, and a flexible connection between the other vehicle member and the said brake band operating to cause the said band to exert a braking pressure against the drum during movements of a predetermined amplitude of the vehicle members away from each other and to release such pressure when such amplitude shall have been exceeded as well as during movements of the said vehicle members toward each other.

11. The combination, with a pair of relatively movable vehicle members, of a brake drum secured to one of said members, a housing arranged concentrically with respect to the said drum and spaced therefrom and movable toward and from said drum, a brake band interposed between the said brake drum and housing and having one end adapted to engage both the drum and the housing and its opposite end secured to the housing and spaced from the drum, a flexible connection between the said drum and the other vehicle member, and a spring connected with said housing for moving the same and the brake band and for taking in the slack of the flexible connection when the vehicle members approach each other.

12. The combination, with two relatively movable vehicle members, of a shock absorber comprising a brake drum secured to one of the said members, a brake band cooperating with said drum, and a flexible connection between the other vehicle member and the said brake band operating to cause the said band to exert a braking pressure against the drum during movements of a predetermined amplitude of the vehicle members away from each other and to release such pressure when such amplitude shall have been exceeded.

13. The combination, with two relatively movable vehicle members, of a shock absorber comprising a brake drum secured to one of the said members, a brake band cooperating with said drum, and a flexible connection between the other vehicle member and one end of the said brake band and operating to force the opposite end of the brake band against the drum and cause the band to exert a braking pressure against the drum during movements of a predetermined amplitude of the vehicle members away from each other and to release such pressure when such amplitude shall have been exceeded.

In testimony whereof, I hereunto affix my signature.

CLAUD H. FOSTER.